April 28, 1959
B. STAHMER
2,884,633
VERTICAL TAKE OFF AND LANDING APPARATUS
FOR USE WITH AIRCRAFT
Filed July 11, 1955
2 Sheets-Sheet 1
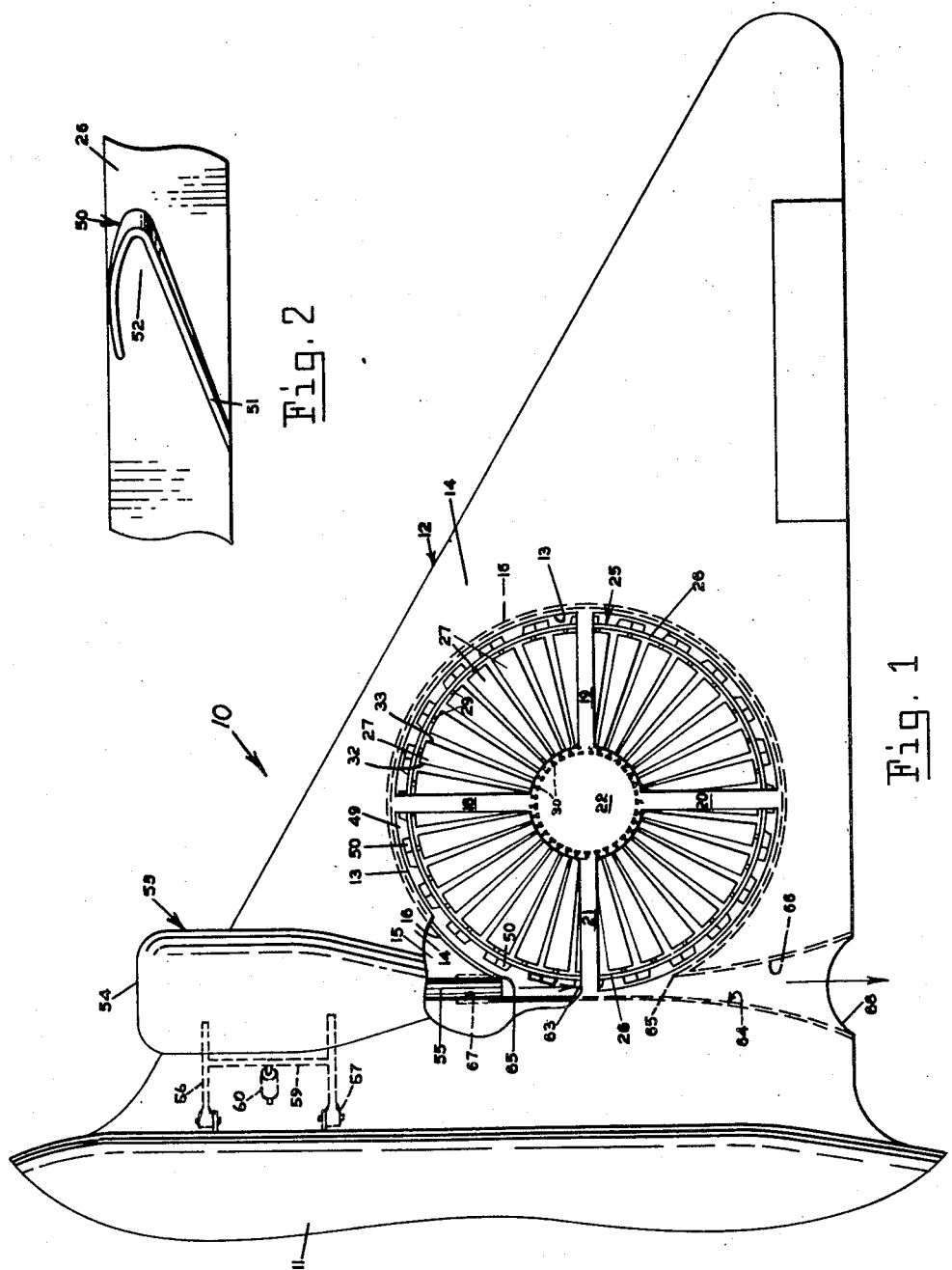
INVENTOR.
BERNHARDT STAHMER

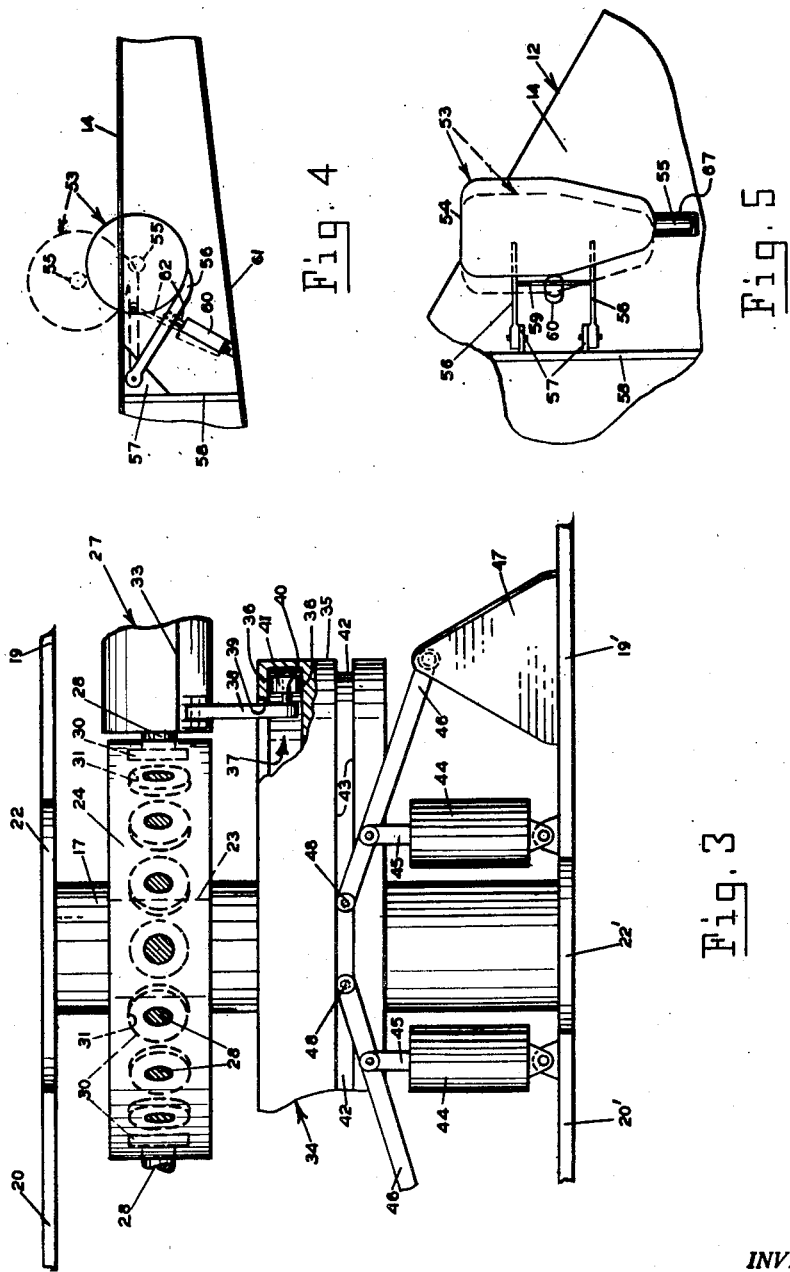

United States Patent Office 2,884,633
Patented Apr. 28, 1959

2,884,633

VERTICAL TAKE OFF AND LANDING APPARATUS FOR USE WITH AIRCRAFT

Bernhardt Stahmer, Omaha, Nebr.

Application July 11, 1955, Serial No. 521,183

2 Claims. (Cl. 244—12)

This invention relates to aircraft and more particularly to aircraft adapted to take off and land in a substantially vertical direction.

An object of the present invention is to provide a new and improved construction and arrangement for aiding an aircraft to take off and land in a substantially vertical direction.

Another object of the present invention is to provide an aircraft with a rotor which may be rotatably mounted in an opening extending through the wing of the aircraft, whereby rotation of the rotor operates to aid the aircraft to take off and land in a substantially vertical direction.

A further object of the present invention is to provide a rotor as described above having a central hub, an outer rim, and a plurality of blades which extend radially from the hub and are pivotally connected at their opposite ends to the hub and the rim respectively; the arrangement further including means for rotating the rotor by the use of a plurality of buckets carried by the rim and driven by the jet stream of a jet engine carried by the wing of the aircraft.

Another object of the present invention is to provide these buckets with a configuration of an airfoil whereby the buckets operate to provide an additional lifting force which is operative on the aircraft.

Yet another object of the present invention is to provide a construction and arrangement as described above, and including means whereby the jet engine may be swung between a first position wherein the jet stream operates to rotate the rotor, and a second position wherein the jet stream by-passes the rotor buckets and operates to provide a forward thrust acting on the aircraft.

Another object of the present invention is to provide a construction and arrangement as described above, and including means for selectively varying the pitch of the rotor blades for varying the magnitude of the lifting force operating on the aircraft as a result of the rotation of the rotor.

A further object of the present invention is to provide a construction and arrangement whereby the rotor blades are operative for closing the opening through the aircraft wing when the rotor is not being rotated.

These and other objects and advantages of the present invention will be apparent from the following description of one form of the invention taken with the accompanying drawing; wherein Fig. 1 is a schematic view illustrating the invention in association with the wing of an aircraft;

Fig. 2 is an enlarged perspective view of a bucket of the rotor;

Fig. 3 is an enlarged schematic view of the means which are operative for varying the pitch of the rotor blades;

Fig. 4 is a schematic view of reduced size looking at one end of the jet engine and showing the two operative positions of the jet engine;

Fig. 5 is a schematic top plan view of reduced size of the jet engine.

Referring now to the drawings, the embodiment of the invention there illustrated, is shown operatively associated with an aircraft 10 having a fuselage portion 11 and a starboard wing 12. It is contemplated that the aircraft may be of any suitable construction and that the port wing (not shown) may be provided with a similar construction and arrangement appropriately adapted for use with the port wing, and otherwise, having substantially the same construction and arrangement as the structure hereinafter described with respect to the starboard wing.

As best shown in Fig. 1, the wing 12 is provided with a cylindrical opening 13 which extends through the upper and lower skins, 14 and 15 respectively, of the wing 12. This opening is defined by a cylindrical wall 16 having an upper edge portion which meets with the inner surface of the upper skin of the wing, and which has a lower edge portion which meets with the inner surface of the lower skin of the wing.

Arranged concentrically in the opening is an upstanding cylindrical shaft 17. This shaft may be fixed in position by any suitable means, schematically illustrated in Figs. 1 and 3, as including four braces 18, 19, 20, 21 which extend from the upper edges of the opening 13 and meet with a disk like member 22 disposed concentrically in the upper portion of the opening. As partially shown in Fig. 3, a similar construction including braces 19' and 20' and disk like member 22' is provided in the lower portion of the opening. These disk like members are fixedly connected to the upper and lower ends of the shaft 17. The upper portion of the shaft is provided with a reduced diameter portion 23 around which a cylindrical hub 24 is rotatably received. This hub forms the base portion of a rotor 25 which broadly includes the hub 24, a cylindrical rim 26, and a plurality of rotor blades 27.

As shown in Fig. 1, the rotor blades 27 extend radially outwardly from the hub 24 and are pivotably mounted to the hub at their inner ends, and are pivotably mounted to the rim 26 at their outer ends. These pivotal connections may be of any suitable construction and are schematically illustrated by a plurality of pins 28 which are fixed to the inner ends of the blades 27 and are pivotally received in the hub and by a plurality of pins 29 which are fixed to the outer ends of the blades and are pivotally received in the rim 26. The inner ends of the pins 28 are provided with cylindrical collars 30 which are rotatably arranged in suitable cylindrical openings 31 in the hub to prevent the pins 28 from being pulled out of the hub. Each blade 27 is pivotally mounted about a radial axis which extends substantially through the center portion of the blade, the construction and arrangement being such that all of the pivotal axes lie in substantially the same plane. The rotor blades are substantially triangular in plan and are arranged with their vertices disposed adjacent to the hub and their bases disposed adjacent to the rim. Also, the blades extend radially outwardly from the rotor and are connected thereto at points disposed equidistantly around the periphery of the rotor.

The rotor is arranged to rotate in a counter clockwise direction as viewed in Fig. 1, and, as subsequently more fully described, the blades may be pivoted about their respective radially extending axes to vary their pitch and thus vary the magnitude of the lifting force operating on the aircraft as a result of the rotation of the rotor. Each of the blades has a leading edge 32 and a trailing edge 33, and a cross section similar to that of a conventional helicopter rotor blade. As shown in Figs. 1 and 3, the blades have been pivoted into a position for providing a lifting force operative on the aircraft, and the leading edge 32 of each blade is elevated with respect to the trailing edge 33 thereof. Finally, each blade is provided with a width between the leading and trailing edges whereby the blades may be pivoted into a substantially co-planar relationship for substantially closing the opening 13.

The pitch of the rotor blades may be selectively and simultaneously controlled by structure as schematically shown in Fig. 3 of the drawings. Arranged co-axially on the upstanding shaft below the hub 24 is a collar 34 which is slidable axially on the shaft 17 and which is prevented from rotating by any suitable key and slot arrangement (not shown). As illustrated, this collar is preferably of hollow construction to reduce the weight of the mechanism carried by the wing, and is provided with a cylindrical outer wall 35. This wall is provided with a pair of planar, parallel and annular, vertically spaced apart flanges 36 which extend inwardly from the wall 35 and around the periphery thereof to define an annular groove or roller track 37. The diameter of the collar is such that the outer edge portions of the collar are disposed substantially directly below the inner end portions of the blades.

Since each rotor blade is connected to the collar by similar means, the construction of only one of the means is shown schematically in the drawings. The inner end of each rotor blade is pivotally connected to the collar by a rod 38. The upper end of this rod may be pivotally connected by any suitable means to the trailing edge 33 of the blade. The lower end of the rod extends through an annular opening 39 in the top of the collar, and is fixed to the inwardly extending end of an axle 40 of a roller 41 which rides around the collar 34 in the track 37 as the rotor is rotated.

The outer periphery of the collar is provided with a circumferential annular groove 42 which is defined by a pair of vertically spaced apart planar shoulders 43. Pivotally mounted on the inner side of an adjacent pair of braces 19' and 20' is a pair of hydraulic motors 44 of the expansion-contraction type, each of which embodies a piston and cylinder and is operative in the well known manner. It is contemplated that another pair of these hydraulic cylinders and associated structure would be disposed on the opposite side of the upstanding shaft 17 and on the other pair of adjacent braces (not shown). Extending upwardly from each cylinder is a piston rod 45 which is connected at its upper end to an intermediate portion of a link 46, and at a point arranged between the mid point of the link and the inner end thereof. The linkage arrangement for each of the motors is similar, and accordingly only the linkage arrangement for the right hand hydraulic motor 44 is fully illustrated. The right hand or outer end of the rod 38 is pivotally mounted to the upper end of an upstanding bracket 47 which is disposed on the brace 19'. The inner end of the rod carries a roller 48 which is adapted to ride in the groove 42 and on the shoulders 43 defining the groove. As previously noted, the collar 34 is slidable axially on the shaft; thus the pitch of the rotor blades may be selectively varied by expanding and contracting the hydraulic motors 44, to raise and lower the collar with respect to the rotor blades 27. It is contemplated that all of the rotor blades will be pivotally connected to the collar in a similar manner by rods having substantially the same length, whereby movement of the collar axially with respect to the upstanding shaft will operate simultaneously to give all of the blades substantially the same pitch.

As shown in Fig. 1, the diameter of the rim 26 is slightly less than the inner diameter of the cylindrical wall 16, whereby the rim and the wall define an annular space 49 around the rim. Carried by the rim, at equally spaced apart positions around the periphery of the rim, are a plurality of buckets 50. These buckets have the general configuration of the bucket as shown in Fig. 2, and are provided with a substantially straight base portion 51 which extends from a lower portion of the rim upwardly and at an angle toward the upper portion of the rim and in the direction of rotation of the rotor. The upper extremity of the base portion 51 is then curved to form a top portion which extends in a reverse direction with respect to the direction of rotation of the rotor. This top portion is curved gradually upwardly toward a high point and then extends slightly downwardly to form a pocket 52 with the base portion of the bucket. The configuration of the bucket is substantially that of an air foil, and since the direction of rotation of the rotor is to the right as seen in Figure 2, the buckets provide an additional lifting force which is operative on the aircraft.

Further, the invention includes a jet engine 53 which is carried by the wing 12 and is disposed with its intake end 54 arranged slightly forward of the leading edge of the wing.

The body of the engine is disposed substantially parallel with the fuselage of the aircraft, and the tailpipe 55 of the engine is directed towards the trailing edge of the wing. Also, the jet engine is swingable between a first or depressed position, as schematically illustrated by full lines in Fig. 4, wherein the jet stream is directed into the pockets 52 of the buckets for rotating the rotor; and a second or elevated position, as illustrated by dotted lines in Fig. 4, wherein the jet stream passes above the buckets 50 and by-passes them, whereby the jet engine operates in the well-known manner to provide a forwardly acting thrust force on the aircraft. The jet engine may be swung between the first and second operative positions by any suitable means. As schematically shown in Figs. 4 and 5, a pair of arms 56 are pivotally connected at their upper ends to a pair of brackets 57 which extend outwardly from a member 58 of the airplane wing. The lower ends of the arms are connected to the underside of the jet engine. A cross brace 59 is connected between the arms, and a hydraulic motor 60 of the expansion-contraction type having a piston and cylinder, is disposed centrally beneath the cross brace and is pivotally supported on a lower member 61 of the wing. The upper end of the hydraulic motor piston rod 62 is pivotally connected to the cross brace 59 intermediate the ends thereof, whereby the jet engine is disposed in the first position when the hydraulic motor is contracted, and the jet engine is disposed in the second position when the hydraulic motor is expanded. More particularly, when the jet engine is in the first position, the tail pipe 55 is directed toward the rotor 25 so that the jet stream is directed substantially tangentially to the rotor, and squarely strikes the pocket 52 of each bucket when the bucket is in the position of bucket 63, as shown in Fig. 1. Thus, the high velocity jet stream of the engine is periodically directed fully into the pocket of each bucket and operates to rotate the rotor in a counter clockwise direction.

Finally, the wing is provided with a passage 64 which accommodates discharge of the jet stream when the jet engine is in the first position. As shown in Fig. 1, the cylindrical wall 16 is provided with an opening 65 accommodating communication between the passage 64, the jet stream and the buckets 50. The part of the wall which defines the forward edge of this opening terminates closely adjacent to the tailpipe, and the part of the wall which defines the rearward edge of the opening meets with the right hand portion of the wall 66 of the passage 64. The wall of the passage is schematically shown in Fig. 1 wherein the under edge of the opening 65 has been omitted to avoid confusion. Except for an opening, which is coextensive with the opening 65, the wall 66 has a circular cross section and substantially fully encloses the passage 64. The forward end of the wall 66 is provided with a substantially vertical U-shaped slot 67 which accommodates movement of the tailpipe 55 when the jet engine is swung between the first and second positions. The U-shaped bottom portion (not shown) of the slot underlies the end portion of the tail pipe when the engine is in the first position as shown in Fig. 1. The forward portion of the wall 66 is substantially cylindrical in shape, and the rearward portion of the wall is provided with a diameter which gradually increases from the rear edge of the opening 65 in the direction of the exhaust opening 68 of the passage 64.

In operation for the purpose of aiding the aircraft in making a vertical take-off, the jet engine is disposed in the first position. The rotor blades are initially given a flat pitch whereby the leading and trailing edges of the blades are all disposed in substantially the same plane. The jet engine is then operated to rotate the rotor until the rotor is turning at the desired number of r.p.m.'s. Thereafter, the rotor blades may be pitched with their leading edges disposed above their trailing edges so as to provide a lifting force which acts on the aircraft and aids the aircraft in executing a vertical takeoff. The pitch of the rotor blades can be varied as desired to vary the magnitude of this lifting force. When the aircraft has reached a sufficient altitude, the jet engine is swung into the second position to provide a forwardly acting thrust force on the aircraft. In this position the tail pipe is disposed above the passage 64 and the upper skin of the wing. The rotor blades are then again returned to a flat pitch whereby the opening 13 in the wing is substantially closed while the aircraft is in flight. In operation, for the purpose of making a vertical landing, the jet engine is again swung into the first position, and the above described operation is repeated.

The foregoing description has been given for clearness of understanding only, and no unnecessary limitation should be implied therefrom, for it will be apparent to those skilled in the art that variations and changes may be made in the invention without departing from the spirit and scope of the appended claims.

What is claimed is:

1. Vertical landing and takeoff mechanism for use in the wing of an aircraft, comprising; a wall substantially circular in top plan view and defining an opening extending through the upper and lower skin portions of the wing, a rotor including a hub, and a rim disposed co-axially around the hub, and a plurality of blades pivotally connected at their inner ends to said hub and pivotally connected at their outer ends to said rim, said blades extending radially from said hub and having their pivotal axes lying in substantially the same plane, each of said blades having a leading edge and a trailing edge, means rotatably mounting said hub co-axially in said opening whereby said rotor is mounted in said opening for rotation in one direction, said rim being disposed inwardly from the wall of said opening and defining with said wall an annular space around the periphery of said rim, means for rotating said rotor including a plurality of buckets attached to the outer periphery of said rim for rotation therewith in said space, and a jet engine pivotally mounted on the wing and shiftable between a first position whereinsaid engine is operative for directing a high velocity jet stream of gas in a direction tangential to said rim and against said buckets for rotating said blades in said one direction and a second position wherein said jet stream passes above and out of operative contact with said buckets and in a direction to provide a forward thrust acting on the aircraft.

2. The construction as set forth in claim 1 wherein said buckets have upper surfaces of somewhat convex shape for providing a lifting force as the buckets rotate.

References Cited in the file of this patent

UNITED STATES PATENTS

| | | |
|---|---|---|
| 220,473 | Greenough | Oct. 14, 1879 |
| 1,195,624 | Tanner | Aug. 22, 1916 |
| 1,783,458 | Windsor | Dec. 2, 1930 |
| 1,820,467 | Liska | Aug. 25, 1931 |
| 2,549,313 | Johnson | Apr. 7, 1951 |
| 2,613,752 | Hawkins | Oct. 14, 1952 |
| 2,633,311 | Van Zandt | Mar. 31, 1953 |
| 2,717,131 | Barrett | Sept. 6, 1955 |

FOREIGN PATENTS

| | | |
|---|---|---|
| 340,357 | France | May 10, 1904 |
| 1,068,404 | France | Feb. 3, 1954 |